US012804439B2

(12) United States Patent
Xiong

(10) Patent No.: US 12,804,439 B2
(45) Date of Patent: Nov. 17, 2026

(54) METHOD AND APPARATUS FOR TRANSMITTING ASSISTANCE INFORMATION, AND READABLE STORAGE MEDIUM

(71) Applicant: Beijing Xiaomi Mobile Software Co., Ltd., Beijing (CN)

(72) Inventor: Yi Xiong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 390 days.

(21) Appl. No.: 18/561,381

(22) PCT Filed: May 24, 2021

(86) PCT No.: PCT/CN2021/095436

§ 371 (c)(1),
(2) Date: Nov. 16, 2023

(87) PCT Pub. No.: WO2022/246591

PCT Pub. Date: Dec. 1, 2022

(65) Prior Publication Data

US 2024/0251276 A1 Jul. 25, 2024

(51) Int. Cl.
*H04W 24/10* (2009.01)

(52) U.S. Cl.
CPC .................................. *H04W 24/10* (2013.01)

(58) Field of Classification Search
CPC . H04W 24/10; H04W 36/0088; H04W 84/06; H04W 24/08; H04W 72/0446; H04W 72/51; H04L 5/0094; H04L 5/0069
See application file for complete search history.

(56) References Cited

U.S. PATENT DOCUMENTS

| | | | | |
|---|---|---|---|---|
| 2015/0327321 | A1 | 11/2015 | Dai et al. | |
| 2019/0320294 | A1* | 10/2019 | Meng | G01C 21/34 |
| 2020/0293508 | A1* | 9/2020 | Tan | H04W 4/029 |
| 2023/0148057 | A1* | 5/2023 | Dong | G01S 5/0063 455/456.1 |

FOREIGN PATENT DOCUMENTS

| | | | |
|---|---|---|---|
| CN | 103580777 | A | 2/2014 |
| JP | 2015-520984 | A | 7/2015 |

OTHER PUBLICATIONS

International Search Report and Written Opinion of International Application No. PCT/CN2021/095436, dated Jan. 24, 2022, 16 pages.

Intel Corporation, "Report of [post113-e][108][NTN] SMTC and measurement gap (Intel)", 3GPP TSG-RAN WG2 Meeting #113bis-e, R2-2102866, Elbonia, Apr. 12-20, 2021, 35 pages.

(Continued)

*Primary Examiner* — Chuong A Ngo
(74) *Attorney, Agent, or Firm* — Finnegan, Henderson, Farabow, Garrett & Dunner, L.L.P.

(57) ABSTRACT

A method for transmitting assistance information is performed by a network device, and includes: sending first indication information to a user equipment, wherein the first indication information is configured to instruct the user equipment to report the assistance information of a target moment, and the target moment includes at least one of a current moment or a future moment.

20 Claims, 3 Drawing Sheets

(56) References Cited

OTHER PUBLICATIONS

Notice of Reasons for Refusal issued by the Japanese Patent Office on Sep. 5, 2024, in corresponding Application No. JP 2023-572151, 4 pages.
Office Action issued by the Patent Office of the Russian Federation Federal Institute of Industrial Property on Jul. 1, 2024, in corresponding Application No. RU 2023133395, 8 pages.
"Power saving techniques, UE assistance information", Sony, 3GPP TSG-RAN WG2 Meeting #107, R2-1909907, Prague, Czech Republic, Aug. 26-30, 2019, 3 pages.
Extended European Search Report Issued in Application No. 21942181.5 dated Feb. 18, 2025, 16 pages.

* cited by examiner

METHOD AND APPARATUS FOR TRANSMITTING ASSISTANCE INFORMATION, AND READABLE STORAGE MEDIUM

CROSS-REFERENCE TO RELATED APPLICATION

This application is a national phase of International Application No. PCT/CN2021/095436, filed on May 24, 2021, the content of which is hereby incorporated by reference in its entirety.

TECHNICAL FIELD

The disclosure relates to the field of wireless communication technology, in particular to a method and a device for transmitting assistance information, and a related readable storage medium.

BACKGROUND

Non-Terrestrial Networks (NTN), i.e., 5-Generation (5G) satellite communication networks, has been introduced in the 5G New Radio (NR). Due to the high altitude of the satellites from the earth, the NTN have a higher signal transmission delay.

SUMMARY

According to a first aspect of embodiments of the disclosure, a method for transmitting assistance information, performed by a network device, is provided. The method includes:

sending first indication information to a user equipment (UE), in which the first indication information is configured to instruct the UE to report the assistance information of a target moment, and the target moment includes at least one of: a current moment or a future moment.

According to a second aspect of embodiments of the disclosure, a method for transmitting assistance information, performed by a user equipment (UE), is provided. The method includes:

receiving first indication information from a network device, in which the first indication information is configured to instruct the UE to report the assistance information of a target moment, and the target moment includes at least one of: a current moment or a future moment;

determining the assistance information of the target moment; and reporting the assistance information of the target moment.

According to a third aspect of embodiments of the disclosure, a communication device is provided. The communication device includes a processor and a memory storing a computer program. The processor is configured to send first indication information to a user equipment. The first indication information is configured to instruct the user equipment to report the assistance information of a target moment. The target moment includes at least one of a current moment or a future moment, It is understandable that the above general description and the following detailed descriptions are illustrative and explanatory only and do not limit the disclosure.

BRIEF DESCRIPTION OF THE DRAWINGS

The accompanying drawings illustrated herein are used to provide a further understanding of embodiments of the disclosure and constitute a part of the application, and the schematic embodiments of the disclosure and illustrations thereof are used to explain embodiments of the disclosure and do not constitute an undue limitation of embodiments of the disclosure.

The accompanying drawings, which are incorporated in and constitute a part of this specification, illustrate embodiments consistent with the disclosure and, together with the description, serve to explain principles of embodiments of the disclosure.

DETAILED DESCRIPTION

Embodiments of the disclosure will be further described with reference to the accompanying drawings and specific implementations.

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

In the Terrestrial Networks (TN) system, a radius of a cell is relatively small, and a transmission delay difference between the transmission delay between a User Equipment (UE) and a cell and the transmission delay between the UE and a different cell is very small, which is much smaller than a length of the Synchronization Signal Block-Measurement Timing Configuration (SMTC) or a measurement gap. However, in the NTN, the radius of the cell is relatively large, and an overlapped range of coverage areas of different satellites is also large. For example, when Satellite 1 provides services to the UE, the UE may also be in a coverage area of Satellite 2/Satellite 3. Therefore, the mobility of the UE needs to be considered, the UE needs to perform measurements of the neighboring areas covered by Satellite 2/Satellite 3 and the effect of poor transmission delay needs to be considered.

Figure 1:
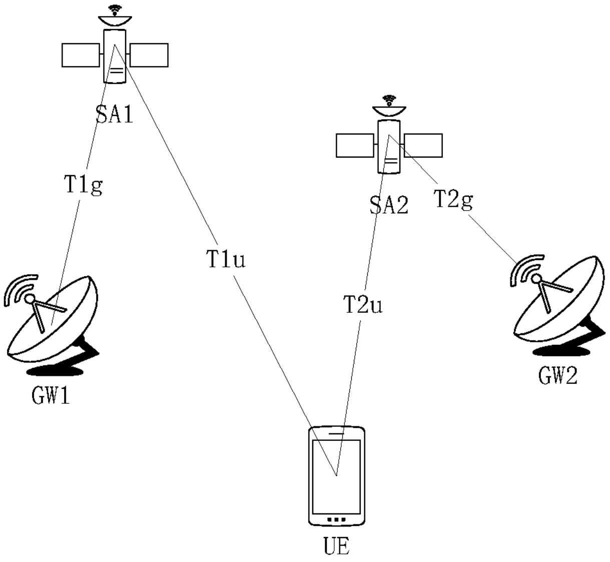
FIG. 1 is a schematic diagram illustrating a Non-Terrestrial Networks (NTN) wireless communication system according to an example embodiment.

For example, as illustrated in FIG. 1, the satellite 1 (SA1) is the satellite of a service cell, and the satellite 2 (SA2) is the satellite of a neighbor cell. The transmission delay of receiving by the UE signals from the service cell is represented as $T1g+T1u$, and the transmission delay of receiving by the UE signals from the neighbor cell is represented as $T2u+T2g$. The transmission delay difference is $T1g+T1u-$ (T2g+T2u). Considering that different satellites have different distances from the UE and the ground station, the transmission delay difference between the receiving by the UE the signals from the service cell and the receiving by the UE the signals from the neighbor cell will be huge, i.e., T1g+T1u−(T2g+T2u) will not converge to 0 and may be larger than the SMTC or the measurement gap.

If the SMTC or measurement gap is configured without considering the transmission delay difference, the UE may miss a measurement window of Synchronization Signal Block (SSB) or the Channel State Information Reference Signal (CSI-RS). As a result, measurements will not be performed on the configured reference signal. Therefore, the network needs to obtain the corresponding transmission delay or transmission delay difference when configuring the SMTC or measurement gap. Since the network cannot obtain the accurate location information of the UE, the UE needs to report assistance information to assist the network in configuring or reconfiguring the SMTC and measurement gap.

In order to prevent the network from being unable to reconfigure appropriate SMTC/measurement gap due to untimely reporting of assistance information and causing the UE to miss the SSB of neighboring cells, the UE is caused to report the assistance information frequently. However, frequent reporting action of the UE will increase the power consumption of the UE, and cause the network side to frequently perform unnecessary reconfiguration. Therefore, how to make the UE report the assistance information reasonably is a technical problem that needs to be solved.

Therefore, embodiments of the disclosure provide methods and apparatus for transmitting assistance information, related communication devices and related storage medium. The network device sends the first indication information to the UE to instruct the UE to report the assistance information of the target moment, such that the UE reports the assistance information of the target moment correspondingly based on the received first indication information. Therefore, the network device controls the reporting action of the UE, and further the network device instructs the UE to report only when the network device needs to use the assistance information, so that the reporting process of the UE is more reasonable and optimized. Therefore, the problem that frequent reporting action of the UE will increase the power consumption of the UE and cause the network device to frequently perform unnecessary reconfiguration can be avoided.

The method for transmitting assistance information according to embodiments of the disclosure may be applied to a Non-Terrestrial Networks (NTN) wireless communication system 100. The NTN wireless communication system 100 may include a network device and a user equipment UE.

Figure 2:
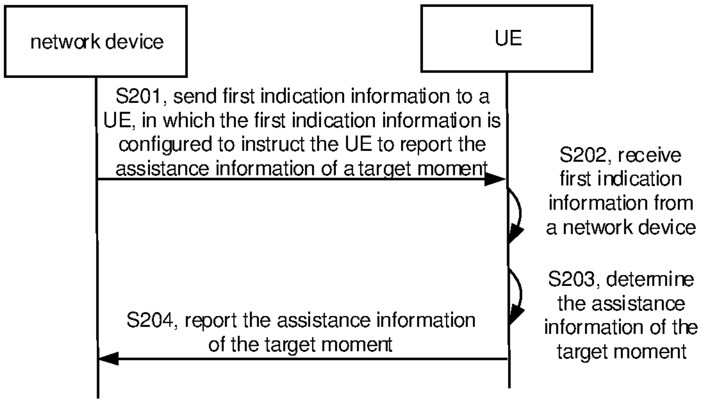
FIG. 2 is a flowchart illustrating a method for transmitting assistance information according to an example embodiment.

Embodiments of the disclosure provide a method for transmitting assistance information, performed by a network device. FIG. 2 is a flowchart illustrating a method for transmitting assistance information according to an example embodiment. As illustrated in FIG. 2, the method includes the following.

At block S201, first indication information is sent to a UE, in which the first indication information is configured to instruct the UE to report the assistance information of a target moment, and the target moment includes at least one of a current moment or a future moment.

In a possible implementation, there is one target moment corresponding to one determined moment. After the UE receives the first indication information, the assistance information reported by the UE is the assistance information of the determined moment.

In a possible implementation, there are target moments corresponding to more than one determined moment. After the UE receives the first indication information, more than one piece of assistance information is reported, each piece of assistance information corresponds to a respective determined moment.

In a possible implementation, for the UE, a target moment is a determined moment.

In a possible implementation, for the UE, a target moment is a moment that is determined through calculation based on multiple parameters sent by the network device.

In an example, there is one target moment and the target moment is the current moment. The network device sends the first indication information to the UE, in which the first indication information is configured to instruct the UE to report the assistance information of the current moment. The UE reports one piece of assistance information, which is the assistance information of the current moment.

In an example, there is one target moment and the target moment is one future moment. The network device sends the first indication information to the UE, in which first indication information is configured to instruct the UE to report the assistance information of the future moment. The UE reports one piece of assistance information, which is the assistance information of the future moment.

In an example, there are target moments and the target moments are the current moment and one future moment. The network device sends the first indication information to the UE, in which the first indication information is configured to instruct the UE to report the assistance information of the current moment and the future moment. The UE reports two pieces of assistance information, namely, the assistance information of the current moment and the assistance information of the future moment.

In an example, there are target moments and the target moments are the current moment and at least two future moments. The network device sends the first indication information to the UE, in which the first indication information is configured to instruct the UE to report the assistance information of the current moment and the at least two future moments. The UE reports a plurality of pieces of assistance information, namely, one piece of assistance information of the current moment and multiple pieces of assistance information of the at least two future moments respectively.

The implementations described in the above embodiments do not represent all implementations consistent with embodiments of the disclosure. Instead, they are merely examples of apparatus and methods consistent with aspects of the disclosure as detailed in the appended claims. It is understandable that the disclosure is not limited to the examples that have been described above, and various combinations, modifications and changes can be made without departing from the scope thereof.

In embodiments of the disclosure, the network device sends the first indication information to the UE to instruct the UE to report the assistance information of the one or more target moments, such that the UE reports the assistance information of the one or more target moments correspondingly based on the received first indication information. Therefore, the network device controls the reporting action of the UE, and further the network device instructs the UE to report only when the network device needs to use the assistance information, so that the reporting process of the UE is more reasonable and optimized. Therefore, the problem that frequent reporting action of the UE will increase the power consumption of the UE and cause the network device to frequently perform unnecessary reconfiguration can be avoided.

Embodiments of the disclosure provide a method for transmitting assistance information, performed by a network device. The method includes:

sending first indication information to a UE, in which the first indication information is configured to instruct the UE to report the assistance information of one or more target moments, and the one or more target moments include a current moment.

In a possible implementation, there is one target moment, which is the current moment.

Embodiments of the disclosure provide a method for transmitting assistance information, performed by a network device. The method includes:

sending first indication information to a UE, in which the first indication information is configured to instruct the UE to report the assistance information of a current moment.

Embodiments of the disclosure provide a method for transmitting assistance information, performed by a network device. The method includes:

sending first indication information to a UE, in which the first indication information is configured to instruct the UE to report the assistance information of one or more target moments, and the one or more target moments include one future moment.

In a possible implementation, there is one target moment, which is the future moment.

Embodiments of the disclosure provide a method for transmitting assistance information, performed by a network device. The method includes:

sending first indication information to a UE, in which the first indication information is configured to instruct the UE to report the assistance information of one or more target moments, and the one or more target moments include a current moment and at least one future moment.

In a possible implementation, there are two target moments, including a current moment and one future moment.

In a possible implementation, there are more than two target moments, including a current moment and more than one future moment.

Embodiment of the disclosure provide a method for transmitting assistance information, performed by a network device. The method includes:

sending first indication information to a UE, in which the first indication information is configured to instruct the UE to report the assistance information of one or more target moments, and the one or more target moments include more than one future moment.

In a possible implementation, there is more than one target moment, including the more than one future moment.

Embodiments of the disclosure provide a method for transmitting assistance information, performed by a network device. The method includes:

sending first indication information to a UE, in which the first indication information is configured to instruct the UE to report the assistance information of one or more target moments, and the one or more target moments includes a current moment and one or more future moments or the one or more target moments include at least one future moment; and sending second indication information to the UE, in which the second indication information is configured to indicate at least one, corresponding to the one or more target moments, of a first moment, a first duration or a time interval.

In some possible examples, the one or more target moments indicated in the first indication information include the current moment and the one or more future moments. The first moment indicated by the second indication information is the current moment, the first duration indicated by the second indication information is 9 seconds, and the time interval indicated by the second indication information is 3 seconds. Therefore, the UE determines that the target moments are the current moment (i.e., 0 seconds), a moment corresponding to the third second after the current moment, a moment corresponding to the sixth second after the current moment, and a moment corresponding to the ninth second after the current moment, and the UE reports the assistance information of each of these target moments.

In some possible examples, the one or more target moments indicated in the first indication information includes the at least one future moment. The first moment indicated by the second indication information is the current moment, the first duration indicated by the second indication information is 9 seconds and the time interval indicated by the second indication information is 3 seconds. Therefore, the UE determines that the target moments are a moment corresponding to the third second after the current moment, a moment corresponding to the sixth second after the current moment, and a moment corresponding to the ninth second after the current moment, and the UE reports the assistance information of each of these target moments.

Embodiments of the disclosure provide a method for transmitting assistance information, performed by a network device. The method includes:

sending broadcast information to a UE, in which the broadcast information includes first indication information and second indication information, the first indication information is configured to instruct the UE to report the assistance information of one or more target moments, the one or more target moments include a current moment and one or more future moments or the one or more target moments include at least one future moment, and the second indication information is configured to indicate at least one, corresponding to the one or more target moment, of a first moment, a first duration or a time interval.

Embodiments of the disclosure provide a method for transmitting assistance information, performed by a network device. The method includes:

sending a dedicated signaling to a UE, in which the dedicated signaling includes first indication information and second indication information, the first indication information is configured to instruct the UE to report the assistance information of one or more target moments, the one or more target moments include a current moment and one or more future moments or the one or more target moments include at least one future moment, and the second indication information is configured to indicate at least one, corresponding to the one or more target moments, of a first moment, a first duration or a time interval.

Embodiments of the disclosure provide a method for transmitting assistance information, performed by a network device. The method includes:

sending first indication information to a UE, in which the first indication information is configured to instruct the UE to report the assistance information of one or more target moments, and the one or more target moments include a current moment and one or more future moments or the one or more target moments includes at least one future moment; and sending second indication information to the UE, in which the second indication information is configured to indicate at least one, corresponding to the one or more target moments, of a first moment, a first duration or a time interval.

The first moment is the current moment or a moment as specified in a protocol other than the current moment.

Embodiments of the disclosure provide a method for transmitting assistance information, performed by a network device. The method includes:

sending first indication information to a UE, in which the first indication information is configured to instruct the UE to report the assistance information of one or more target moments, and the one or more target moments include a current moment and one or more future moments or the one or more target moments include at least one future moment; and sending third indication information to the UE, in which the third indication information is configured to indicate at least one, corresponding to the one or more target moments, of a second moment, a quantity or a periodic time interval.

In some possible examples, the one or more target moments indicated in the first indication information includes the current moment and the one or more future moments. The second moment indicated by the third indication information is the current moment, the quantity indicated by the third indication information is 4, and the periodic time interval indicated by the third indication information is 3 seconds. Therefore, the UE determines that the target moments are the current moment (i.e., 0 seconds), a moment corresponding to the third second after the current moment, a moment corresponding to the sixth second after the current moment, and a moment corresponding to the ninth second after the current moment, and the UE reports the assistance information of each of these target moments.

In some possible examples, the one or more target moments indicated in the first indication information includes the at least one future moment. The second moment indicated by the third indication information is the current moment, the quantity indicated by the third indication information is 4, and the periodic time interval indicated by the third indication information is 3 seconds. Therefore, the UE determines that the target moments are a moment corresponding to the third second after the current moment, a moment corresponding to the sixth second after the current moment, and a moment corresponding to the ninth second after the current moment and a moment corresponding to the twelfth second after the current moment, and the UE reports the assistance information of each of these target moments.

Embodiments of the disclosure provide a method for transmitting assistance information, performed by a network device. The method includes:

sending broadcast information to a UE, in which the broadcast information includes first indication information and third indication information, the first indication information is configured to instruct the UE to report the assistance information of one or more target moments, the one or more target moments include a current moment and one or more future moments or the one or more target moments include at least one future moment, and the third indication information is configured to indicate at least one, corresponding to the one or more target moments, of a second moment, a quantity or a periodic time interval.

Embodiment of the disclosure provide a method for transmitting assistance information, performed by a network device. The method includes:

sending a dedicated signaling to a UE, in which the dedicated signaling includes first indication information and third indication information, the first indication information is configured to instruct the UE to report the assistance information of one or more target moments, the one or more target moments include a current moment and one or more future moments or the one or more target moments include at least one future moment, and the third indication information is configured to indicate at least one, corresponding to the one or more target moments, of a second moment, a quantity or a periodic time interval.

Embodiments of the disclosure provide a method for transmitting assistance information, performed by a network device. The method includes:

sending first indication information to a UE, in which the first indication information is configured to instruct the UE to report the assistance information of one or more target moments, and the one or more target moments include a current moment and one or more future moments or the one or more target moments include at least one future moment; and sending third indication information to the UE, in which the third indication information is configured to indicate at least one, corresponding to the one or more target moments, of a second moment, a quantity or a periodic time interval.

The second moment is the current moment or a moment as specified in a protocol other than the current moment.

Embodiments of the disclosure provide a method for transmitting assistance information, performed by a network device. The method includes:

sending first indication information to a UE, in which the first indication information is configured to instruct the UE to report the assistance information of one or more target moments, and the one or more target moments include at least one of: a current moment or future moment(s); and sending fourth indication information to the UE, in which the fourth indication information is configured to indicate the one or more target moments.

In a possible example, the one or more target moments indicated in the first indication information include the current moment. The fourth indication information indicates the current moment.

In a possible example, the one or more target moments indicated in the first indication information include a future moment. The fourth indication information indicates that the target moment is a moment corresponding to the 2nd second after the current moment.

In a possible example, the one or more target moments indicated in the first indication information include the current moment and a future moment. The fourth indication information indicates that the target moments include the current moment and a moment corresponding to the third second after the current moment.

In a possible example, the one or more target moments indicated by the first indication information include the current moment and the future moments. The fourth indication information indicates that the target moments include the current moment, a moment corresponding to the fourth second after the current moment, a moment corresponding to the eighth second after the current moment, and a moment corresponding to the twelfth second after the current moment.

Embodiments of the disclosure provide a method for transmitting assistance information, performed by a network device. The method includes:

sending broadcast information to a UE, in which the broadcast information includes first indication information and fourth indication information, the first indication information is configured to instruct the UE to report the assistance information of one or more target moments, the one or more target moments include at least one of a current moment or future moment(s), and the fourth indication information is configured to indicate the one or more target moments.

Embodiments of the disclosure provide a method for transmitting assistance information, performed by a network device. The method includes:

sending a dedicated signaling to a UE, in which the dedicated signaling includes first indication information and fourth indication information, the first indication information is configured to instruct the UE to report the assistance information of one or more target moments, the one or more target moments include at least one of a current moment or future moment(s), and the fourth indication information is configured to indicate the one or more target moments.

Embodiments of the disclosure provide a method for transmitting assistance information, performed by a network device. The method includes:

sending first indication information to a UE, in which the first indication information is configured to instruct the UE to report the assistance information of one or more target moment, and the one or more target moments includes at least one of a current moment or future moment(s); and sending fourth indication information to the UE, in which the fourth indication information is configured to indicate the one or more target moments.

The fourth indication information is configured to indicate a second duration, in which a target moment is an ending moment of the second duration by taking the current moment as a starting moment.

Embodiments of the disclosure provide a method for transmitting assistance information, performed by a network device. The method includes:

sending first indication information to a UE, in which the first indication information is configured to instruct the UE to report the assistance information of one or more target moments, and the one or more target moments include at least one of a current moment or future moment(s); and sending fourth indication information to the UE, in which the fourth indication information is configured to indicate a timer, the timer uses the current moment as a starting moment and uses a second duration as a timer duration, and a moment when the timer is expired is the target moment.

Embodiments of the disclosure provide a method for transmitting assistance information, performed by a network device. The method includes:

sending first indication information to a UE, in which the first indication information is configured to instruct the UE to report the assistance information of one or more target moments, and the one or more target moments include at least one of a current moment or future moment(s); and sending fourth indication information to the UE, in which the fourth indication information is configured to indicate the one or more target moments.

The fourth indication information is configured to indicate absolute time information corresponding to the one or more target moments.

Embodiments of the disclosure provide a method for transmitting assistance information, performed by a network device. The method includes:

sending first indication information to a UE, in which the first indication information is configured to instruct the UE to report the assistance information of one or more target moments, and the one or more target moments include at least one of a current moment or future moment(s); and sending fourth indication information to the UE, in which the fourth indication information is configured to indicate the one or more target moments.

The fourth indication information is configured to indicate the absolute time information corresponding to the one or more target moments.

The absolute time information is represented as a coordinated universal time corresponding to each target moment.

Embodiments of the disclosure provide a method for transmitting assistance information, performed by a network device. The method includes:

sending first indication information to a UE, in which the first indication information is configured to instruct the UE to report the assistance information of one or more target moments, and the one or more target moments include at least one of a current moment or future moment(s); and sending fourth indication information to the UE, in which the fourth indication information is configured to indicate the one or more target moments.

The fourth indication information is configured to indicate absolute time information corresponding to the one or more target moments.

The absolute time information is represented as a system frame number corresponding to each target moment.

Embodiments of the disclosure provide a method for transmitting assistance information, performed by a network device. The method includes:

sending first indication information to a UE, in which the first indication information is configured to instruct the UE to report the assistance information of one or more target moments, and the one or more target moments include at least one of a current moment or future moment(s); and sending fifth indication information to the UE, in which the fifth indication information is configured to indicate contents of the assistance information, and the contents of the assistance information includes at least one of:

location information of the UE, a distance between the UE and a service satellite, a signal transmission delay between the UE and a satellite, a distance difference, or a delay difference;

in which the distance difference is a difference between a first distance and a second distance, the first distance is the distance between the UE and the service satellite, and the second distance is a distance between the UE and a satellite of a neighbor cell; and in which the delay difference is a difference between a first delay and a second delay, the first delay is the signal transmission delay between the UE and the service satellite, and the second delay is a signal transmission delay between the UE and the satellite of the neighbor cell.

Embodiments of the disclosure provide a method for transmitting assistance information, performed by a network device. The method includes:

sending broadcast information to a UE, in which the broadcast information includes first indication information and fifth indication information, the first indication information is configured to instruct the UE to report the assistance information of one or more target moments, and the one or more target moments include at least one of a current moment or future moment(s).

The fifth indication information is configured to indicate contents of the assistance information, and the contents of the assistance information include at least one of:

location information of the UE, a distance between the UE and a service satellite, a signal transmission delay between the UE and a satellite, a distance difference, or a delay difference;

in which the distance difference is a difference between a first distance and a second distance, the first distance is a distance between the UE and the service satellite, and the second distance is a distance between the UE and a satellite of a neighbor cell; and in which the delay difference is a difference between a first delay and a second delay, the first delay is the signal transmission delay between the UE and the service satellite, and the second delay is a signal transmission delay between the UE and the satellite of the neighbor cell.

Embodiments of the disclosure provide a method for transmitting assistance information, performed by a network device. The method includes:

sending a dedicated signaling to a UE, in which the dedicated signaling includes first indication information and fifth indication information, the first indication information is configured to instruct the UE to report the assistance information of one or more target moments, and the one or more target moments include at least one of a current moment or future moment(s).

The fifth indication information is configured to indicate contents of the assistance information, and the contents of the assistance information include at least one of:

location information of the UE, a distance between the UE and a service satellite, a signal transmission delay between the UE and a satellite, a distance difference, or a delay difference;

in which the distance difference is a difference between a first distance and a second distance, the first distance is a distance between the UE and the service satellite, and the second distance is a distance between the UE and a satellite of a neighbor cell; and in which the delay difference is a difference between a first delay and a second delay, the first delay is the signal transmission delay between the UE and the service satellite, and the second delay is a signal transmission delay between the UE and the satellite of the neighbor cell.

Embodiments of the disclosure provide a method for transmitting assistance information, performed by a network device. The method includes:

sending broadcast information to a UE, in which the broadcast information includes first indication information, the first indication information is configured to instruct the UE to report the assistance information of one or more target moments, and the one or more target moments include at least one of a current moment or future moment(s).

Embodiments of the disclosure provide a method for transmitting assistance information, performed by a network device. The method includes:

sending a dedicated signaling to a UE, in which the dedicated signaling includes first indication information, the first indication information is configured to instruct the UE to report the assistance information of one or more target moments, and the one or more target moments include at least one of a current moment or future moment(s).

Embodiments of the disclosure provide a method for transmitting assistance information, performed by a network device. The method includes:

sending first indication information to a UE, in which the first indication information is configured to instruct the UE to report the assistance information of one or more target moments, and the one or more target moments include at least one of a current moment or future moment(s);

receiving, from the UE, the assistance information of the one or more target moments reported by the UE; and updating measurement configuration information based on the assistance information of the one or more target moments, in which the measurement configuration information includes at least one of a Synchronization Signal Block-Measurement Timing Configuration (SMTC) or a measurement gap.

Embodiments of the disclosure provide a method for transmitting assistance information, performed by a network device. The method includes:

sending first indication information to a UE, in which the first indication information is configured to instruct the UE to report the assistance information of one or more target moments, and the one or more target moments include at least one of a current moment or future moment(s);

receiving, from the UE, the assistance information of the one or more target moments reported by the UE; and updating, at the one or more target moment, measurement configuration information based on the assistance information of the one or more target moments, in which the measurement configuration information includes at least one of a Synchronization Signal Block-Measurement Timing Configuration (SMTC) or a measurement gap.

Embodiments of the disclosure provide a method for transmitting assistance information, performed by a network device. The method includes:

sending first indication information to a UE, in which the first indication information is configured to instruct the UE to report the assistance information of one or more target moments, and the one or more target moments include at least one of a current moment or future moment(s);

receiving, from the UE, the assistance information of the one or more target moments reported by the UE; and configuring, based on the assistance information of the one or more target moments, at least one of an offset, a period or a duration for the SMTC of different target moments, or configuring, based on the assistance information of the one or more target moments, at least one of an offset, a period or a duration for the measurement gap of different target moments, in which the measurement configuration information includes at least one of the SMTC or the measurement gap.

Embodiments of the disclosure provide a method for transmitting assistance information, performed by a UE. FIG. 2 is a flowchart illustrating a method for transmitting assistance information according to an example embodiment. As illustrated in FIG. 2, the method includes the following.

At step S202, first indication information is received from a network device, in which the first indication information is configured to instruct the UE to report the assistance information of one or more target moments, and the one or more target moments include at least one of a current moment or one or more future moments.

At step S203, the assistance information of the one or more target moments is determined.

At step S204, the assistance information of the one or more target moments is reported.

In a possible implementation, there is one target moment corresponding to one determined moment. After the UE receives the first indication information, the assistance information reported by the UE is the assistance information of the determined moment.

In a possible implementation, there are target moments corresponding to more than one determined moment. After the UE receives the first indication information, more than one piece of assistance information is reported, each piece of assistance information corresponds to a respective determined moment.

In a possible implementation, for the UE, a target moment is a determined moment.

In a possible implementation, for the UE, a target moment is a moment that is determined through calculation based on multiple parameters sent by the network device.

In an example, there is one target moment and the target moment is the current moment. The network device sends the first indication information to the UE, in which the first indication information is configured to instruct the UE to report the assistance information of the current moment. The UE reports one piece of assistance information, which is the assistance information of the current moment.

In an example, there is one target moment and the target moment is one future moment. The network device sends the first indication information to the UE, in which first indication information is configured to instruct the UE to report the assistance information of the future moment. The UE reports one piece of assistance information, which is the assistance information of the future moment.

In an example, there are target moments and the target moments are the current moment and one future moment, the network device sends the first indication information to the UE, in which the first indication information is configured to instruct the UE to report the assistance information of the current moment and the future moment. The UE reports two pieces of assistance information, namely, the assistance information of the current moment and the assistance information of the future moment.

In an example, there are target moments and the target moments are the current moment and at least two future moments. The network device sends the first indication information to the UE, in which the first indication information is configured to instruct the UE to report the assistance information of the current moment and the at least two future moments. The UE reports a plurality of pieces of assistance information, namely, one piece of assistance information of the current moment and multiple pieces of assistance information of the at least two future moments.

In embodiments of the disclosure, the network device sends the first indication information to the UE to instruct the UE to report the assistance information of the one or more target moments, and the UE reports the assistance information of the one or more target moments correspondingly based on the received first indication information. Therefore, the network device controls the reporting action of the UE, and further the network device instructs the UE to report only when the network device needs to use the assistance information, so that the reporting process of the UE is more reasonable and optimized. Therefore, the problem that frequent reporting of the UE will increase the power consumption of the UE and cause the network device to frequently perform unnecessary reconfiguration can be avoided.

Embodiments of the disclosure provide a method for transmitting assistance information, performed by a UE. The method includes:

- receiving first indication information from a network device, in which the first indication information is configured to instruct the UE to report the assistance information of one or more target moments, and the one or more target moments include the current moment;
- determining the assistance information of the one or more target moments; and
- reporting the assistance information of the one or more target moments.

In a possible implementation, in response to the one or more target moments indicated in the first indication information including the current moment and there being one target moment, it is determined that the target moment is the current moment.

Embodiments of the disclosure provide a method for transmitting assistance information, performed by a UE. The method includes:

- receiving first indication information from a network device, in which the first indication information is configured to instruct the UE to report the assistance information of one or more target moments, and the one or more target moments include one future moment;
- determining the assistance information of the one or more target moments; and
- reporting the assistance information of the one or more target moments.

In a possible implementation, there is one target moment and the target moment includes one future moment. Therefore, it is determined that the target moment is the future moment.

Embodiments of the disclosure provide a method for transmitting assistance information, performed by a UE. The method includes:

- receiving first indication information from a network device, in which the first indication information is configured to instruct the UE to report the assistance information of one or more target moments, and the one or more target moments includes at least one future moment;
- determining the assistance information of the one or more target moments; and
- reporting the assistance information of the one or more target moments.

In a possible implementation, there is more than one target moment, and the more than one target moment includes more than one future moment.

Embodiments of the disclosure provide a method for transmitting assistance information, performed by a UE. The method includes:

receiving first indication information from a network device, in which the first indication information is configured to instruct the UE to report the assistance information of one or more target moments, and the one or more target moments include a current moment and at least one future moment;

determining the assistance information of the one or more target moments; and reporting the assistance information of the one or more target moments.

In a possible implementation, there are 2 target moments, including the current moment and one future moment.

In a possible implementation, there are more than 2 target moments, including the current moment and more than one future moment.

Embodiments of the disclosure provide a method for transmitting assistance information, performed by a UE. The method includes:

receiving first indication information from a network device, in which the first indication information is configured to instruct the UE to report the assistance information of one or more target moments, and the one or more target moments includes at least one of a current moment or future moment(s);

receiving second indication information from the network device, in which the second indication information is configured to indicate at least one, corresponding to the one or more target moments, of a first moment, a first duration or a time interval;

determining the assistance information of the one or more target moments; and reporting the assistance information of the one or more target moments.

In some possible implementations, the current moment is a moment when the UE receives the first indication information.

In some possible implementations, the current moment is a moment when the UE receives the second indication information.

In some possible implementations, the first indication information and the second indication information are sent simultaneously.

In some possible implementations, the first indication information and the second indication information are sent at different times.

Embodiments of the disclosure provide a method for transmitting assistance information, performed by a UE. The method includes:

receiving first indication information from a network device, in which the first indication information is configured to instruct the UE to report the assistance information of one or more target moments, and the one or more target moments include at least one of a current moment or future moment(s);

receiving second indication information from the network device, in which the second indication information is configured to indicate at least one, corresponding to the one or more target moments, of a first moment, a first duration or a time interval;

determining, based on the first duration and the time interval, at least one target moment that satisfies the time interval within the first duration by taking the first moment as a starting moment;

determining the assistance information of the at least one target moment; and reporting the assistance information of the at least one target moment.

Embodiments of the disclosure provide a method for transmitting assistance information, performed by a UE. The method includes:

receiving first indication information from a network device, in which the first indication information is configured to instruct the UE to report the assistance information of one or more target moments, and the one or more target moments includes at least one of a current moment or future moment(s);

receiving second indication information from the network device, in which the second indication information is configured to indicate at least one, corresponding to the one or more target moments, of a first moment, a first duration or a time interval;

receiving second indication information from the network device, in which the second indication information is configured to indicate at least one, corresponding to the one or more target moments, of a first moment, a first duration or a time interval;

determining, based on the first duration and the time interval, at least one target moment that satisfies the time interval within the first duration by taking the first moment as a starting moment;

determining the assistance information of the at least one target moment; and reporting the assistance information of the at least one target moment.

Embodiments of the disclosure provide a method for transmitting assistance information, performed by a UE. The method includes:

receiving first indication information from a network device, in which the first indication information is configured to instruct the UE to report the assistance information of one or more target moments, and the one or more target moments include at least one of a current moment or future moment(s);

receiving second indication information from the network device, in which the second indication information is configured to indicate at least one, corresponding to the one or more target moments, of a first moment, a first duration or a time interval;

receiving second indication information from the network device, in which the second indication information is configured to indicate at least one, corresponding to the one or more target moments, of a first moment, a first duration or a time interval;

determining, based on the first duration and the time interval, at least one target moment that satisfies the time interval within the first duration by taking the first moment as a starting moment, in which the first moment is a moment corresponding to the 2nd second after the current moment specified by a protocol;

determining the assistance information of the at least one target moment; and reporting the assistance information of the at least one target moment.

Embodiments of the disclosure provide a method for transmitting assistance information, performed by a network device. The method includes:

receiving first indication information from a network device, in which the first indication information is configured to instruct the UE to report the assistance information of one or more target moments, and the one or more target moments include a current moment and at least one future moment;

receiving second indication information from the network device, in which the second indication information is configured to indicate at least one, corresponding to the target moments, of a first moment, a first duration or a time interval, in which the first moment is the current moment;

determining, based on the first duration and the time interval, at least one target moment that satisfies the time interval within the first duration by taking the first moment as a starting moment;

determining the assistance information of the at least one target moment; and reporting the assistance information of the at least one target moment.

In some possible examples, the one or more target moments indicated in the first indication information includes the current moment and the future moment(s). The first moment indicated by the second indication information is the current moment, the first duration indicated by the second indication information is 9 seconds, and the time interval indicated by the second indication information is 3 seconds. Therefore, the UE determines that the target moments are the current moment (i.e., 0 seconds), a moment corresponding to the third second after the current moment, a moment corresponding to the sixth second after the current moment, and a moment corresponding to the ninth second after the current moment, and the UE reports the assistance information of each of these target moments.

Embodiments of the disclosure provide a method for transmitting assistance information, performed by a UE. The method includes:

receiving first indication information from a network device, in which the first indication information is configured to instruct the UE to report the assistance information of one or more target moments, and the one or more target moments includes more than one future moment;

receiving second indication information from the network device, in which the second indication information is configured to indicate at least one, corresponding to the one or more target moments, of a first moment, a first duration or a time interval, in which the first moment is the current moment;

determining, based on the first duration and the time interval, at least one target moment that satisfies the time interval within the first duration by taking the first moment as a starting moment;

determining the assistance information of the at least one target moment; and reporting the assistance information of the at least one target moment.

In some possible examples, the one or more target moments indicated in the first indication information include more than one future moment. The first moment indicated by the second indication information is the current moment, the first duration indicated by the second indication information is 9 seconds and the time interval indicated by the second indication information is 3 seconds. Therefore, the UE determines that the target moments are a moment corresponding to the third second after the current moment, a moment corresponding to the sixth second after the current moment, and a moment corresponding to the ninth second after the current moment, and the UE reports the assistance information of each of these target moments.

Embodiments of the disclosure provide a method for transmitting assistance information, performed by a network device. The method includes:

receiving first indication information from a network device, in which the first indication information is configured to instruct the UE to report the assistance information of one or more target moments, and the one or more target moments include more than one future moment;

receiving second indication information from the network device, in which the second indication information is configured to indicate at least one, corresponding to the one or more target moments, of a first moment, a first duration or a time interval, in which the first moment is a moment corresponding to the 2nd second after a current moment as specified in a protocol;

determining, based on the first duration and the time interval, at least one target moment that satisfies the time interval within the first duration by taking the first moment as a starting moment;

determining the assistance information of the at least one target moment; and reporting the assistance information of the at least one target moment.

In some possible examples, the one or more target moments indicated in the first indication information includes more than one future moment. The first moment indicated by the second indication information is a moment corresponding to the 2nd second after a current moment, the first duration indicated by the second indication information is 9 seconds and the time interval indicated by the second indication information is 3 seconds. Therefore, the UE determines that the target moments are a moment corresponding to the 2nd second after the current moment, a moment corresponding to the fifth second after the current moment, and a moment corresponding to the eighth second after the current moment, and the UE reports the assistance information of each of these target moments.

Embodiments of the disclosure provide a method for transmitting assistance information, performed by a UE. The method includes:

receiving first indication information from a network device, in which the first indication information is configured to instruct the UE to report the assistance information of one or more target moments, and the one or more target moments includes at least one of a current moment or future moment(s);

receiving third indication information from the network device, in which the third indication information is configured to indicate at least one, corresponding to the one or more target moments, of a second moment, a quantity or a periodic time interval;

determining the assistance information of the one or more target moments; and reporting the assistance information of the one or more target moments.

In some possible implementations, the current moment is a moment when the UE receives the first indication information.

In some possible implementations, the current moment is a moment when the UE receives the third indication information.

In some possible implementations, the first indication information and the third indication information are sent simultaneously.

In some possible implementations, the first indication information and the third indication information are sent at different times.

Embodiments of the disclosure provide a method for transmitting assistance information, performed by a network device. The method includes:

receiving first indication information from a network device, in which the first indication information is configured to instruct the UE to report the assistance information of one or more target moments, and the one or more target moments include at least one of a current moment or future moment(s);

receiving third indication information from the network device, in which the third indication information is configured to indicate at least one, corresponding to the one or more target moments, of a second moment, a quantity or a periodic time interval;

determining, based on the quantity and the periodic time interval, at least one target moment that satisfies the time interval by taking the second moment as a starting moment, in which the number of the at least one target moment equals to the quantity;

determining the assistance information of the at least one target moment; and reporting the assistance information of the at least one target moment.

Embodiments of the disclosure provide a method for transmitting assistance information, performed by a UE. The method includes:

receiving first indication information from a network device, in which the first indication information is configured to instruct the UE to report the assistance information of one or more target moments, and the one or more target moments include at least one of a current moment or future moment(s);

receiving third indication information from the network device, in which the third indication information is configured to indicate at least one, corresponding to the one or more target moments, of a second moment, a quantity or a periodic time interval, and the second moment is the current moment;

determining, based on the quantity and the periodic time interval, at least one target moment that satisfies the time interval by taking the second moment as a starting moment, in which the number of the at least one target moment equals to the quantity;

determining the assistance information of the at least one target moment; and reporting the assistance information of the at least one target moment.

Embodiments of the disclosure provide a method for transmitting assistance information, performed by a UE. The method includes:

receiving first indication information from a network device, in which the first indication information is configured to instruct the UE to report the assistance information of one or more target moments, and the one or more target moments include at least one of a current moment or future moment(s);

receiving third indication information from the network device, in which the third indication information is configured to indicate at least one, corresponding to the one or more target moments, of a second moment, a quantity or a periodic time interval, and the second moment is a moment as specified in a protocol other than the current moment;

determining, based on the quantity and the periodic time interval, at least one target moment that satisfies the time interval by taking the second moment as a starting moment, in which the number of the at least one target moment equals to the quantity;

determining the assistance information of the at least one target moment; and reporting the assistance information of the at least one target moment.

Embodiments of the disclosure provide a method for transmitting assistance information, performed by a UE. The method includes:

receiving first indication information from a network device, in which the first indication information is configured to instruct the UE to report the assistance information of one or more target moments, and the one or more target moments include a current moment and at least one future moment;

receiving third indication information from the network device, in which the third indication information is configured to indicate at least one, corresponding to the one or more target moments, of a second moment, a quantity or a periodic time interval, and the second moment is the current moment;

determining, based on the quantity and the periodic time interval, at least one target moment that satisfies the time interval by taking the second moment as a starting moment, in which the number of the at least one target moment equals to the quantity;

determining the assistance information of the at least one target moment; and reporting the assistance information of the at least one target moment.

In some possible examples, the one or more target moment indicated in the first indication information include the current moment and the future moment(s). The second moment indicated by the third indication information is the current moment, the quantity indicated by the third indication information is 4, and the periodic time interval indicated by the third indication information is 3 seconds. Therefore, the UE determines that the target moments are the current moment (i.e., 0 seconds), a moment corresponding to the third second after the current moment, a moment corresponding to the sixth second after the current moment, and a moment corresponding to the ninth second after the current moment, and the UE reports the assistance information of each of these target moments.

Embodiments of the disclosure provide a method for transmitting assistance information, performed by a UE. The method includes:

receiving first indication information from a network device, in which the first indication information is configured to instruct the UE to report the assistance information of one or more target moments, and the one or more target moments include more than one future moment;

receiving third indication information from the network device, in which the third indication information is configured to indicate at least one, corresponding to the one or more target moments, of a second moment, a quantity or a periodic time interval, and the second moment is the current moment;

determining, based on the quantity and the periodic time interval, at least one target moment that satisfies the time interval by taking the second moment as a starting moment, in which the number of the at least one target moment equals to the quantity;

determining the assistance information of the at least one target moment; and reporting the assistance information of the at least one target moment.

In some possible examples, the one or more target moments indicated in the first indication information include more than one future moment. The second moment indicated by the third indication information is the current moment, the quantity indicated by the third indication information is 4, and the periodic time interval indicated by the third indication information is 3 seconds. Therefore, the UE determines that the target moments are a moment corresponding to the third second after the current moment, a moment corresponding to the sixth second after the current moment, a moment corresponding to the ninth second after the current moment and a moment corresponding to the twelfth second after the current moment, and the UE reports the assistance information of each of these target moments.

Embodiments of the disclosure provide a method for transmitting assistance information, performed by a UE. The method includes:

- receiving first indication information from a network device, in which the first indication information is configured to instruct the UE to report the assistance information of one or more target moments, and the one or more target moments include more than one future moment;
- receiving third indication information from the network device, in which the third indication information is configured to indicate at least one, corresponding to the one or more target moments, of a second moment, a quantity or a periodic time interval, and the second moment is a moment corresponding to the 2nd second after the current moment specified by a protocol;
- determining, based on the quantity and the periodic time interval, at least one target moment that satisfies the time interval by taking the second moment as a starting moment, in which the number of the at least one target moment equals to the quantity;
- determining the assistance information of the at least one target moment; and
- reporting the assistance information of the at least one target moment.

In some possible examples, the one or more target moments indicated in the first indication information includes more than one future moment. The second moment indicated by the third indication information is the moment corresponding to the 2nd second after the current moment, the quantity indicated by the third indication information is 4, and the periodic time interval indicated by the third indication information is 3 seconds. Therefore, the UE determines that the target moments are a moment corresponding to the 2nd second after the current moment, a moment corresponding to the fifth second after the current moment, a moment corresponding to the eighth second after the current moment and a moment corresponding to the eleventh second after the current moment, and the UE reports the assistance information of each of these target moments.

Embodiments of the disclosure provide a method for transmitting assistance information, performed by a UE. The method includes:

- receiving first indication information from a network device, in which the first indication information is configured to instruct the UE to report the assistance information of one or more target moments, and the one or more target moments include at least one of a current moment or future moment(s);
- receiving fourth indication information from the network device, in which the fourth indication information is configured to indicate the one or more target moments;
- determining the assistance information of the one or more target moments; and
- reporting the assistance information of the one or more target moments.

In some possible implementations, the current moment is a moment when the UE receives the first indication information.

In some possible implementations, the current moment is a moment when the UE receives the fourth indication information.

In some possible implementations, the first indication information and the fourth indication information are sent simultaneously.

In some possible implementations, the first indication information and the fourth indication information are sent at different times.

Embodiments of the disclosure provide a method for transmitting assistance information, performed by a UE. The method includes:

- receiving first indication information from a network device, in which the first indication information is configured to instruct the UE to report the assistance information of one or more target moments, and the one or more target moments include at least one of a current moment or future moment(s);
- receiving fourth indication information from the network device, in which the fourth indication information is configured to indicate the one or more target moments, and the fourth indication information is configured to indicate a second duration, in which a target moment is an ending moment of the second duration by taking the current moment as a starting moment;
- determining the one or more target moments based on the fourth indication information;
- determining the assistance information of the one or more target moments; and
- reporting the assistance information of the one or more target moments.

Embodiments of the disclosure provide a method for transmitting assistance information, performed by a UE. The method includes:

- receiving first indication information from a network device, in which the first indication information is configured to instruct the UE to report the assistance information of a target moment, and the target moment includes one future moment;
- receiving fourth indication information from the network device, in which the fourth indication information is configured to indicate the target moment, and the fourth indication information is configured to indicate a second duration, in which the target moment is an ending moment of the second duration by taking the current moment as a starting moment;
- determining the target moment based on the fourth indication information;
- determining the assistance information of the target moment; and
- reporting the assistance information of the target moment.

Embodiments of the disclosure provide a method for transmitting assistance information, performed by a UE. The method includes:

- receiving first indication information from a network device, in which the first indication information is configured to instruct the UE to report the assistance information of a target moment, and the target moment includes one future moment;
- receiving fourth indication information from the network device, in which the fourth indication information is configured to indicate the target moment, and the fourth indication information is configured to indicate absolute time information corresponding to the target moment;
- determining the target moment based on the fourth indication information;

determining the assistance information of the target moment; and reporting the assistance information of the target moment.

Embodiments of the disclosure provide a method for transmitting assistance information, performed by a UE. The method includes:

receiving first indication information from a network device, in which the first indication information is configured to instruct the UE to report the assistance information of one or more target moments, and the one or more target moments includes at least one of a current moment or future moment(s);

receiving fourth indication information from the network device, in which the fourth indication information is configured to indicate the one or more target moments, and the fourth indication information is configured to indicate absolute time information corresponding to the one or more target moments;

determining the one or more target moments based on the fourth indication information;

determining the assistance information of the one or more target moments; and reporting the assistance information of the one or more target moments.

Embodiments of the disclosure provide a method for transmitting assistance information, performed by a UE. The method includes:

receiving first indication information from a network device, in which the first indication information is configured to instruct the UE to report the assistance information of one or more target moments, and the one or more target moments include at least one of a current moment or future moment(s);

determining the assistance information of the one or more target moments; and reporting the assistance information of the one or more target moments.

The contents of the assistance information include at least one of:

location information of the UE, a distance between the UE and a service satellite, a signal transmission delay between the UE and a satellite, a distance difference, or a delay difference;

in which the distance difference is a difference between a first distance and a second distance, the first distance is the distance between the UE and the service satellite, and the second distance is a distance between the UE and a satellite of a neighbor cell; and in which the delay difference is a difference between a first delay and a second delay, the first delay is the signal transmission delay between the UE and the service satellite, and the second delay is a signal transmission delay between the UE and the satellite of the neighbor cell.

Embodiments of the disclosure provide a method for transmitting assistance information, performed by a UE. The method includes:

receiving first indication information from a network device, in which the first indication information is configured to instruct the UE to report the assistance information of one or more target moments, and the one or more target moments include at least one of a current moment or future moment(s);

receiving fifth indication information from the network device, in which the fifth indication information is configured to indicate contents of the assistance information; determining the contents of the assistance information based on the fifth indication information;

determining the assistance information of the one or more target moments; and reporting the assistance information of the one or more target moments.

In some possible implementations, the current moment is a moment when the UE receives the first indication information.

In some possible implementations, the current moment is a moment when the UE receives the fifth indication information.

In some possible implementations, the first indication information and the fifth indication information are sent simultaneously.

In some possible implementations, the first indication information and the fifth indication information are sent at different times.

Embodiments of the disclosure provide a method for transmitting assistance information, performed by a UE. The method includes:

receiving first indication information from a network device, in which the first indication information is configured to instruct the UE to report the assistance information of one or more target moments, and the one or more target moments include at least one of a current moment or future moment(s);

determining the contents of the assistance information based on a protocol;

determining the assistance information of the one or more target moments; and reporting the assistance information of the one or more target moments.

Embodiments of the disclosure provide a method for transmitting assistance information, performed by a UE. The method includes:

receiving first indication information from a network device, in which the first indication information is configured to instruct the UE to report the assistance information of one or more target moments, and the one or more target moments include at least one of a current moment or future moment(s);

determining the assistance information of the one or more target moments; and reporting the assistance information of the one or more target moments.

Determining the assistance information of the one or more target moments includes:

in response to there being one target moment and the target moment being the current moment, determining the assistance information of the current moment based on location information of the UE at the current moment and location information of the service satellite at the current moment; or in response to there being one or more target moments and the one or more target moments being one or more future moments, determining the assistance information of the one or more target moments based on location information of the UE at the current moment and location information of the service satellite at the one or more target moments; or in response to there being one or more target moments and the one or more target moments being one or more future moments, determining the assistance information of the one or more target moments based on location information of the UE at the one or more target moments and location information of the service satellite at the one or more target moments.

Embodiments of the disclosure provides a method for transmitting assistance information, performed by a UE. The method includes:

receiving first indication information from a network device, in which the first indication information is configured to instruct the UE to report the assistance information of one or more target moments, and the one or more target moments include at least one of a current moment or future moment(s);

determining the assistance information of the one or more target moments; and reporting the assistance information of the one or more target moments.

The current moment is a moment when the UE receives the first indication information.

Embodiments of the disclosure provide a method for transmitting assistance information, executed by a UE. The method includes:

receiving first indication information from a network device, in which the first indication information is configured to instruct the UE to report the assistance information of one or more target moments, and the one or more target moments include at least one of a current moment or future moment(s);

determining the assistance information of the one or more target moments; and reporting the assistance information of the one or more target moments.

The current moment is a moment specified by a protocol.

Embodiments of the disclosure provide a method for transmitting assistance information, performed by a UE. The method includes:

receiving broadcast information from a network device, in which the broadcast information includes the first indication information, the first indication information is configured to instruct the UE to report the assistance information of one or more target moments, and the one or more target moments include at least one of a current moment or future moment(s);

determining the assistance information of the one or more target moments; and reporting the assistance information of the one or more target moments.

Embodiments of the disclosure provide a method for transmitting assistance information, performed by a UE. The method includes:

receiving a dedicated signaling from a network device, in which the dedicated signaling includes the first indication information, the first indication information is configured to instruct the UE to report the assistance information of one or more target moments, and the one or more target moments include at least one of a current moment or future moment(s);

determining the assistance information of the one or more target moments; and reporting the assistance information of the one or more target moments.

Based on the same concept as the above method embodiments, embodiments of the disclosure also provide a communication apparatus, which can have the functions of the network device in the above method embodiments, and can be used to perform the steps executed by the network device in the above method embodiments. The functions can be implemented by a hardware, software or hardware executing corresponding software. The hardware or software includes one or more modules corresponding to the above functions.

Figure 3:
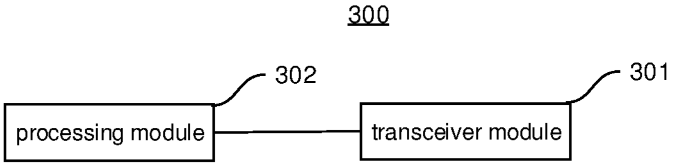
FIG. 3 is a schematic diagram illustrating an apparatus for transmitting assistance information according to an example embodiment.

In a possible implementation, the communication apparatus 300 illustrated in FIG. 3 can serve as the network device involved in the above method embodiments, and perform the steps executed by the network device in the above method embodiments. As illustrated in FIG. 3, the communication apparatus 300 may include a transceiver module 301 and a processing module 302. The transceiver module 301 and the processing module 302 are coupled to each other. The transceiver module 301 is configured to support the communication apparatus 300 to communicate. The transceiver module 301 can have wireless communication functions. For example, the transceiver module 301 can perform wireless communication with other communication devices through a wireless radio interface. The processing module 302 is configured to support the communication apparatus 300 to perform the processing operations in the above method embodiments, which include but are not limited to: generating information/messages sent by the transceiver module 301, and/or, demodulating and decoding signals received by the transceiver module 301.

When performing the steps executed by the network device, the transceiver module 301 is configured to send first indication information to a UE, in which the first indication information is configured to instruct the UE to report assistance information of one or more target moments, and the one or more target moments include at least one of a current moment or future moment(s).

In a possible implementation, the transceiver module 301 is further configured to: send second indication information to the UE, in which the second indication information is configured to indicate at least one, corresponding to the one or more target moments, of a first moment, a first duration or a time interval.

In a possible implementation, the first moment is the current moment or any moment as specified in a protocol other than the current moment.

In a possible implementation, the transceiver module 301 is further configured to: send third indication information to the UE, in which the third indication information is configured to indicate at least one, corresponding to the one or more target moments, of a second moment, a quantity or a periodic time interval.

In a possible implementation, the second moment is the current moment or a moment as specified in a protocol other than the current moment.

In a possible implementation, the transceiver module 301 is further configured to: send fourth indication information to the UE, in which the fourth indication information is configured to indicate the one or more target moments.

In a possible implementation, the fourth indication information is configured to indicate a second duration, in which a target moment is an ending moment of the second duration by using the current moment as a starting moment;

or, the fourth indication information is configured to indicate absolute time information corresponding to the one or more target moments.

In a possible implementation, the transceiver module 301 is further configured to: send fifth indication information to the UE, in which the fifth indication information is configured to indicate contents of the assistance information, and the contents of the assistance information include at least one of:

location information of the UE, a distance between the UE and a service satellite, a signal transmission delay between the UE and a satellite, a distance difference, or a delay difference;

in which the distance difference is a difference between a first distance and a second distance, the first distance is the distance between the UE and the service satellite, and the second distance is a distance between the UE and a satellite of a neighbor cell; and in which the delay difference is a difference between a first delay and a second delay, the first delay is the signal transmission delay between the UE and the service satellite, and the second delay is a signal transmission delay between the UE and the satellite of the neighbor cell.

In a possible implementation, the transceiver module 301 is further configured to: send broadcast information to the UE, in which the broadcast information includes the first indication information; or send a dedicated signaling to the UE, in which the dedicated signaling includes the first indication information.

In a possible implementation, the transceiver module 301 is further configured to: receive, from the UE, the assistance information of the one or more target moments reported by the UE.

The processing module 302 is configured to: update measurement configuration information based on the assistance information of the one or more target moments, in which the measurement configuration information includes at least one of a SMTC or a measurement gap.

In a possible implementation, the processing module 302 is further configured to: update the measurement configuration information based on the assistance information of the one or more target moments by:

updating the measurement configuration information at the one or more target moments based on the assistance information of the one or more target moments.

In a possible implementation, the processing module 302 is further configured to: update the measurement configuration information based on the assistance information of the one or more target moments by: configuring, based on the assistance information of the one or more target moments, at least one of an offset, a period or a duration for the SMTC of different target moments; or configuring, based on the assistance information of the one or more target moments, at least one of an offset, a period or a duration for the measurement gap of different target moments.

Figure 4:
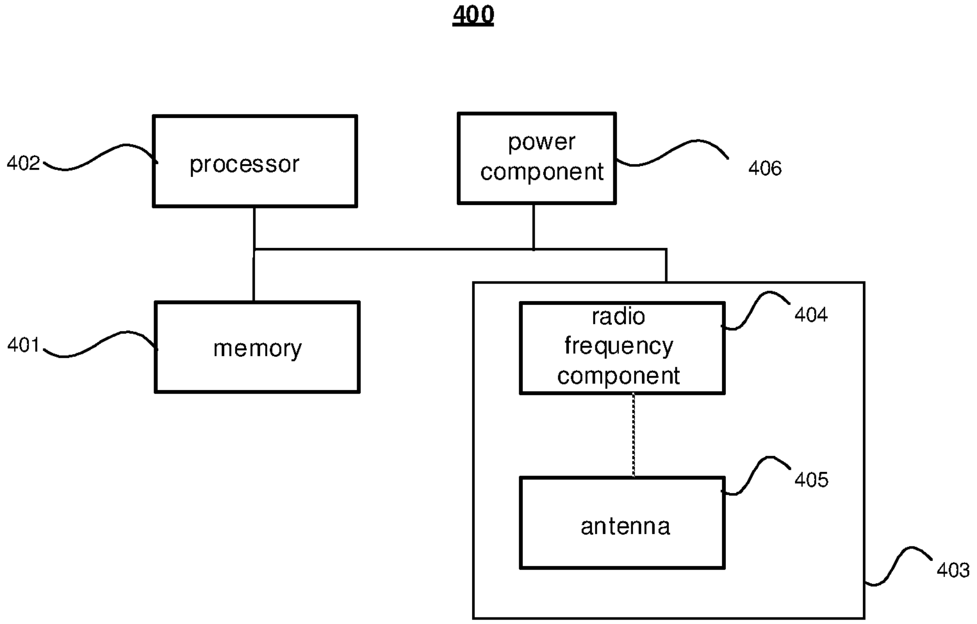
FIG. 4 is a schematic diagram illustrating a device for transmitting assistance information according to an example embodiment.

When the communication apparatus is a network device, its structure may also be illustrated in FIG. 4. The structure of the communication apparatus is illustrated by taking a base station as an example. As illustrated in FIG. 4, the device 400 includes a memory 401, a processor 402, a transceiver component 403, and a power component 406. The memory 401 is coupled with the processor 402 and can be used to store a program and data necessary for the communication device 400 to implement functions. The processor 402 is configured to support the communication device 400 to perform corresponding functions of the above methods, and the functions can be implemented by calling the program stored in the memory 401. The transceiver component 403 may be a wireless transceiver, which may be used to support the communication device 400 to receive and send signaling and/or data through a wireless radio interface. The transceiver component 403 may also be called a transceiver unit or a communication unit. The transceiver component 403 may include a radio frequency component 404 and one or more antennas 405. The radio frequency component 404 may be a remote radio unit (RRU), which can be used for transmitting radio frequency signals and conversing radio frequency signals and baseband signals. The one or more antennas 405 can be used for radiating and receiving radio frequency signals.

When the communication device 400 needs to send data, the processor 402 can perform baseband processing on the data to be sent, and transmit baseband signals to the RRU. The RRU performs radio frequency processing on the baseband signals and sends the radio frequency signals in the form of electromagnetic waves through the antenna. When data is sent to the communication device 400, the RRU receives the radio frequency signals through the antenna, converts the radio frequency signals into the baseband signals, and sends the baseband signals to the processor 402. The processor 402 converts the baseband signals into data and processes the data.

Based on the same concept as the above method embodiments, embodiments of the disclosure further provide a communication apparatus, which can have the functions of the UE in the above method embodiments, and can be used to perform the steps executed by the UE in the above method embodiments. The functions can be implemented by a hardware, software or hardware executing corresponding software. The hardware or software includes one or more modules corresponding to the above functions.

Figure 5:
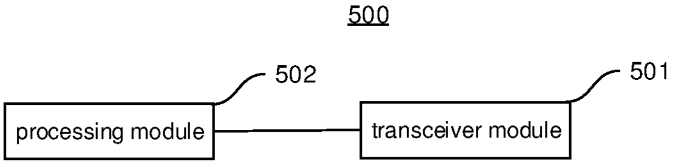
FIG. 5 is a schematic diagram illustrating another apparatus for transmitting assistance information according to an example embodiment.

In a possible implementation, the communication apparatus 500 illustrated in FIG. 5 can serve as the UE involved in the above method embodiments, and perform the steps executed by the UE in the above method embodiments. As illustrated in FIG. 5, the communication apparatus 500 may include a transceiver module 501 and a processing module 502. The transceiver module 501 and the processing module 502 are coupled to each other. The transceiver module 501 is configured to support the communication apparatus 500 to communicate. The transceiver module 501 can have wireless communication functions, for example, it can perform wireless communication with other communication devices through a wireless radio interface. The processing module 502 is configured to support the communication apparatus 500 to perform the processing operations in the above method embodiments, which include but are not limited to: generating information/messages sent by the transceiver module 501, and/or, demodulating and decoding signals received by the transceiver module 501.

When performing the steps executed by the UE, the transceiver module 501 is configured to receive first indication information from a network device, in which the first indication information is configured to instruct the UE to report the assistance information of one or more target moments, and the one or more target moments include at least one of a current moment or future moment(s).

The processing module 502 is configured to determine the assistance information of the one or more target moments.

The transceiver module 501 is configured to report the assistance information of the one or more target moments.

In a possible implementation, the method further includes:

receiving second indication information from the network device, in which the second indication information is configured to indicate at least one, corresponding to the one or more target moments, of a first moment, a first duration or a time interval.

In a possible implementation, the method further includes:

determining, based on the first duration and the time interval, at least one target moment that satisfies the time interval within the first duration by taking the first moment as a starting moment, in which the one or more target moment includes at least one of a current moment or future moment(s).

In a possible implementation, the first moment is the current moment or a moment as specified in a protocol other than the current moment.

In a possible implementation, the method further includes:

receiving third indication information from the network device, in which the third indication information is configured to indicate at least one, corresponding to the one or more target moments, of a second moment, a quantity or a periodic time interval.

In a possible implementation, the method further includes:

determining, based on the quantity and the periodic time interval, at least one target moment that satisfies the time interval by taking the second moment as a starting moment, in which the number of the at least one target moment equals to the quantity, and the at least one target moment includes at least one of a current moment or future moment(s).

In a possible implementation, the second moment is the current moment or a moment as specified in a protocol other than the current moment.

In a possible implementation, the method further includes:

receiving fourth indication information from the network device, in which the fourth indication information is configured to indicate the one or more target moments.

In a possible implementation, the fourth indication information is configured to indicate a second duration, in which a target moment is an ending moment of the second duration by taking the current moment as a starting moment;

or, the fourth indication information is configured to indicate absolute time information corresponding to the one or more target moments.

The method further includes:

determining the one or more target moments based on the fourth indication information.

In a possible implementation, contents of the assistance information include at least one of:

location information of the UE, a distance between the UE and a service satellite, a signal transmission delay between the UE and a satellite, a distance difference, or a delay difference;

in which the distance difference is a difference between a first distance and a second distance, the first distance is the distance between the UE and the service satellite, and the second distance is a distance between the UE and a satellite of a neighbor cell; and in which the delay difference is a difference between a first delay and a second delay, the first delay is the signal transmission delay between the UE and the service satellite, and the second delay is a signal transmission delay between the UE and the satellite of the neighbor cell.

In a possible implementation, the method further includes:

receiving fifth indication information from the network device, in which the fifth indication information is configured to indicate contents of the assistance information; and determining the contents of the assistance information based on the fifth indication information, or determining the contents of the assistance information based on a protocol.

In a possible implementation, determining the assistance information of the one or more target moments includes:

in response to there being one target moment and the target moment being the current moment, determining the assistance information of the current moment based on location information of the UE at the current moment and location information of the service satellite at the current moment; or in response to there being one or more target moments and the each target moment being a future moment, determining the assistance information of the one or more target moments based on location information of the UE at the current moment and location information of the service satellite at the one or more target moments; or in response to there being one or more target moments and each target moment being a future moment, determining the assistance information of the one or more target moments based on location information of the UE at the one or more target moments and location information of the service satellite at the one or more target moments.

In a possible implementation, the current moment is a moment when the UE receives the first indication information or a moment specified by the protocol.

In a possible implementation, receiving the first indication information from the network device includes:

receiving broadcast information from the network device, in which the broadcast information includes the first indication information;

or, receiving a dedicated signaling from the network device, in which the dedicated signaling includes the first indication information.

Figure 6:
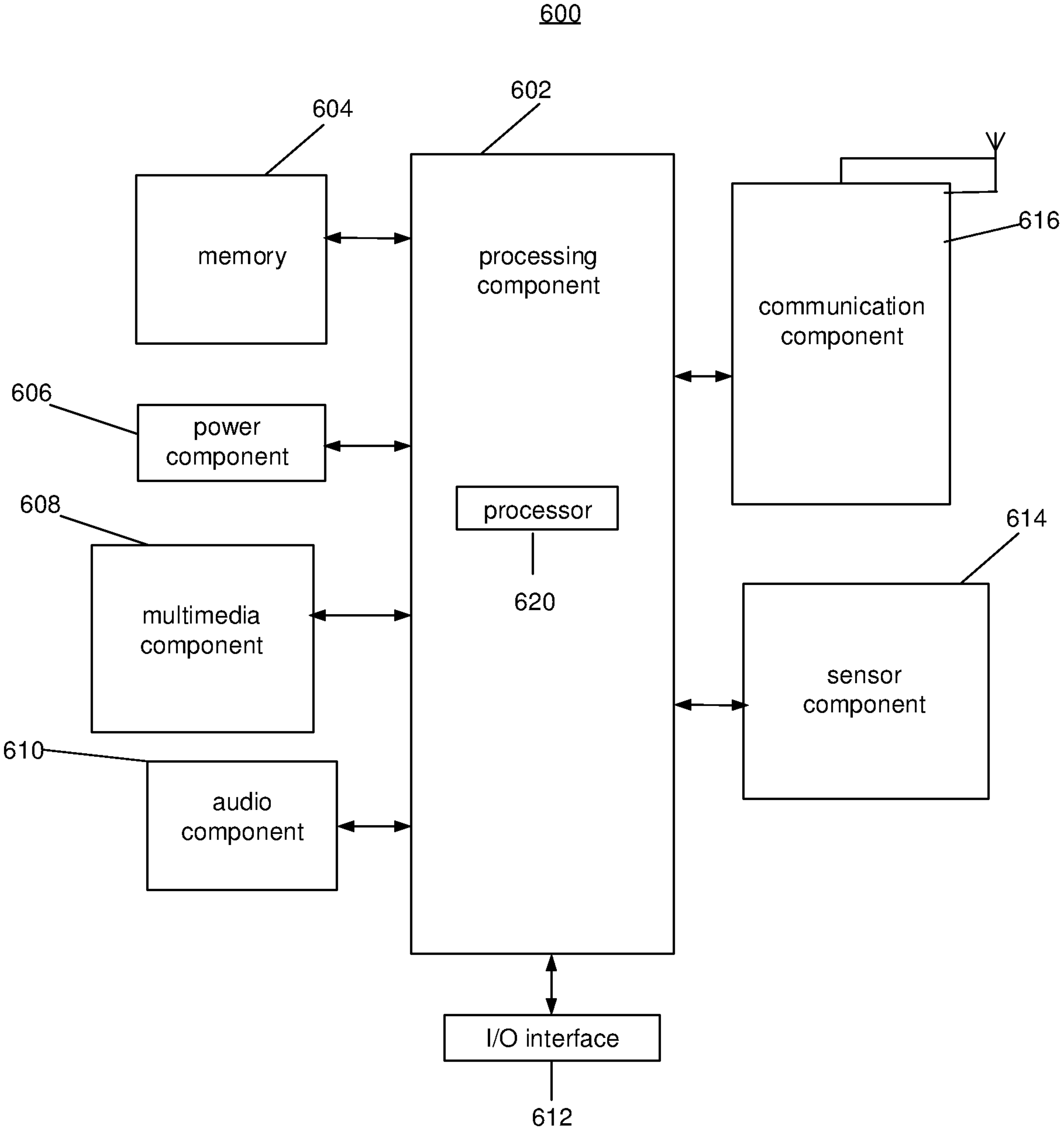
FIG. 6 is a schematic diagram illustrating another device for transmitting assistance information according to an example embodiment.

When the communication device is a UE, its structure may also be illustrated in FIG. 6. The device 600 may be a mobile phone, a computer, a digital broadcasting terminal, a message transceiver device, a game console, a tablet device, a medical device, a fitness device and a personal digital assistant.

As illustrated in FIG. 6, the device 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the device 600, such as the operations associated with display, telephone call, data communication, camera operation, and recording operation. The processing component 602 may include one or more processors 620 to perform instructions to implement all or part of the steps in the above described methods. Moreover, the processing component 602 may include one or more modules which facilitate the interaction between the processing component 602 and other components. For example, the processing component 602 may include a multimedia module to facilitate the interaction between the multimedia component 608 and the processing component 602.

The memory 304 is configured to store various types of data to support the operation of the device 600. Examples of such data include instructions for any applications or methods operated on the device 600, contact data, phonebook data, messages, pictures, videos, etc. The memory 604 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read-Only Memory (PROM), a Read Only Memory (ROM), a magnetic memory, a flash memory, a magnetic or optical disk.

The power component 606 provides power to various components of the device 600. The power component 606 may include a power management system, one or more power sources, and any other components associated with the generation, management, and distribution of power in the device 600.

The multimedia component 608 includes a screen providing an output interface between the device 600 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front-facing camera and/or a rear-facing camera. When the device 600 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 610 is configured to output and/or input audio signals. For example, the audio component 610 includes a microphone (MIC) configured to receive an external audio signal when the device 600 is in an operation mode, such as a calling mode, a recording mode, and a voice recognition mode. The received audio signal may be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide status assessments of various aspects of the device 600. For instance, the sensor component 614 may detect an open/closed status of the device 600, relative positioning of components, e.g., the display and the keypad, of the device 600, a change in position of the device 600 or a component of the device 600, a presence or absence of a user contact with the device 600, an orientation or an acceleration/deceleration of the device 600, and a change in temperature of the device 600. The sensor component 614 may include a proximity sensor configured to detect the presence of nearby objects without any physical contact. The sensor component 614 may also include a light sensor, such as a Complementary Metal Oxide Semiconductor (CMOS) or Charge-Coupled Device (CCD) image sensor, for use in imaging applications. In some embodiments, the sensor component 614 may also include an accelerometer sensor, a gyroscope sensor, a magnetic sensor, a pressure sensor, or a temperature sensor.

The communication component 616 is configured to facilitate communication, wired or wirelessly, between the device 600 and other devices. The device 600 can access a wireless network based on a communication standard, such as WiFi, 2G, or 3G, or a combination thereof. In embodiments, the communication component 616 receives a broadcast signal from an external broadcast management system or broadcast associated information via a broadcast channel. In embodiments, the communication component 616 further includes a Near Field Communication (NFC) module to facilitate short-range communication. For example, the NFC module may be implemented based on a radio-frequency identification (RFID) technology, an Infrared Data Association (IrDA) technology, an Ultra-Wide Band (UWB) technology, a Blue Tooth (BT) technology, and other technologies.

In embodiments, the device 600 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the above described methods.

In embodiments, there is also provided a non-transitory computer readable storage medium including instructions, such as the memory 604, executable by the processor 620 in the device 600, for implementing the above methods. For example, the non-transitory computer-readable storage medium may be a ROM, a Random Access Memory (RAM), a CD-ROM, a magnetic tape, a floppy disc, and an optical data storage device.

INDUSTRIAL PRACTICALITY

The network device sends the first indication information to the UE to instruct the UE to report the assistance information of the one or more target moments, and the UE reports the assistance information of the one or more target moments correspondingly based on the received first indication information. Therefore, the network device controls the reporting action of the UE, and further the network device instructs the UE to report only when the network device needs to use the assistance information, so that the reporting process of the UE is more reasonable and optimized. Therefore, the problem that frequent reporting of the UE will increase the power consumption of the UE and cause the network device to frequently perform unnecessary reconfiguration can be avoided.

What is claimed is:

1. A method for transmitting assistance information, performed by a network device, comprising:

sending indication information to a user equipment, wherein the indication information is configured to instruct the user equipment to report the assistance information of a target moment, the indication information indicates contents of the assistance information, and the target moment comprises at least one of a current moment or a future moment; and receiving the assistance information reported by the user equipment;

wherein the contents of the assistance information comprise at least one of:

location information of the user equipment, a distance between the user equipment and a service satellite, a signal transmission delay between the user equipment and a satellite, a distance difference, or a delay difference;

wherein the distance difference is a difference between a first distance and a second distance, the first distance is the distance between the user equipment and the service satellite, and the second distance is a distance between the user equipment and a satellite of a neighbor cell; and wherein the delay difference is a difference between a first delay and a second delay, the first delay is a signal transmission delay between the user equipment and the service satellite, and the second delay is a signal transmission delay between the user equipment and the satellite of the neighbor cell.

2. The method of claim 1, wherein the indication information is first indication information, and the method further comprises at least one of:

sending second indication information to the user equipment, wherein the second indication information is configured to indicate at least one, corresponding to the target moment, of a first moment, a duration or a time interval; or sending third indication information to the user equipment, wherein the third indication information is configured to indicate at least one, corresponding to the target moment, of a second moment, a quantity or a periodic time interval.

3. The method of claim 1, wherein the indication information is first indication information, and the method further comprises:

sending second indication information to the user equipment, wherein the second indication information is configured to indicate the target moment.

4. The method of claim 3, wherein, the second indication information is configured to indicate a duration, wherein the target moment is an ending moment of the duration by taking the current moment as a starting moment; or the second indication information is configured to indicate absolute time information corresponding to the target moment.

5. The method of claim 1, wherein sending the indication information to the user equipment comprises:

sending broadcast information to the user equipment, wherein the broadcast information comprises the indication information; or, sending a dedicated signaling to the user equipment, wherein the dedicated signaling comprises the indication information.

6. The method of claim 1, further comprising:

updating measurement configuration information based on the assistance information, wherein the measurement configuration information comprises at least one of: Synchronization Signal Block-Measurement Timing Configuration (SMTC) or a measurement gap.

7. The method of claim 6, wherein updating the measurement configuration information based on the assistance information of the target moment comprises at least one of:

updating the measurement configuration information at the target moment based on the assistance information of the target moment;

configuring, based on the assistance information of the target moment, at least one of an offset, a period or a duration for the SMTC of different target moments; or configuring, based on the assistance information of the target moment, at least one of an offset, a period or a duration for the measurement gap of different target moments.

8. The method of claim 1, wherein the current moment is a moment when the user equipment receives the indication information or a moment specified by a protocol.

9. A method for transmitting assistance information, performed by a user equipment, comprising:

receiving indication information from a network device, wherein the indication information is configured to instruct the user equipment to report the assistance information of a target moment, the indication information indicates contents of the assistance information, and the target moment comprises at least one of a current moment or a future moment;

determining the assistance information; and reporting the assistance information;

wherein contents of the assistance information comprise at least one of:

location information of the user equipment, a distance between the user equipment and a service satellite, a signal transmission delay between the user equipment and a satellite, a distance difference, or a delay difference;

wherein the distance difference is a difference between a first distance and a second distance, the first distance is the distance between the user equipment and the service satellite, and the second distance is a distance between the user equipment and a satellite of a neighbor cell; and wherein the delay difference is a difference between a first delay and a second delay, the first delay is a signal transmission delay between the user equipment and the service satellite, and the second delay is a signal transmission delay between the user equipment and the satellite of the neighbor cell.

10. The method of claim 9, wherein the indication information is first indication information, and the method further comprises at least one of:

receiving second indication information from the network device, wherein the second indication information is configured to indicate at least one, corresponding to the target moment, of a first moment, a duration or a time interval; or receiving third indication information from the network device, wherein the third indication information is configured to indicate at least one, corresponding to the target moment, of a second moment, a quantity or a periodic time interval.

11. The method of claim 10, wherein the assistance information is configured for the network device to update measurement configuration information based on the assistance information, wherein the measurement configuration information comprises at least one of: Synchronization Signal Block-Measurement Timing Configuration (SMTC) or a measurement gap.

12. The method of claim 10, wherein the current moment is a moment when the user equipment receives the indication information or a moment specified by a protocol.

13. The method of claim 9, wherein the indication information is first indication information, and the method further comprises:

receiving second indication information from the network device, wherein the second indication information is configured to indicate the target moment.

14. The method of claim 13, further comprising: determining the target moment based on the second indication information; wherein, the second indication information is configured to indicate a duration, wherein the target moment is an ending moment of the duration by taking the current moment as a starting moment; or, the second indication information is configured to indicate absolute time information corresponding to the target moment.

15. The method of claim 9, wherein determining the assistance information of the target moment comprises:

in response to the target moment being the current moment, determining the assistance information of the current moment based on location information of the user equipment at the current moment and location information of a service satellite at the current moment; or in response to the target moment being the future moment, determining the assistance information of the target moment based on location information of the user equipment at the current moment and location information of a service satellite at the target moment; or in response to the target moment being the future moment, determining the assistance information of the target moment based on location information of the user equipment at the target moment and location information of a service satellite at the target moment.

16. The method of claim 9, wherein receiving the indication information from the network device comprises:

receiving broadcast information from the network device, wherein the broadcast information comprises the indication information; or, receiving a dedicated signaling from the network device, wherein the dedicated signaling comprises the indication information.

17. A communication device, comprising:

a processor; and a memory storing a computer program;

wherein the processor is configured to perform the method of claim 9.

18. A communication device, comprising:

a processor; and a memory storing a computer program;

wherein the processor is configured to:

send indication information to a user equipment, wherein the indication information is configured to instruct the user equipment to report assistance information of a target moment, the indication information indicates contents of the assistance information, and the target moment comprises at least one of a current moment or a future moment; and receiving the assistance information reported by the user equipment;

wherein the contents of the assistance information comprise at least one of:

location information of the user equipment, a distance between the user equipment and a service satellite, a signal transmission delay between the user equipment and a satellite, a distance difference, or a delay difference;

wherein the distance difference is a difference between a first distance and a second distance, the first distance is the distance between the user equipment and the service satellite, and the second distance is a distance between the user equipment and a satellite of a neighbor cell; and wherein the delay difference is a difference between a first delay and a second delay, the first delay is a signal transmission delay between the user equipment and the service satellite, and the second delay is a signal transmission delay between the user equipment and the satellite of the neighbor cell.

19. The communication device of claim 18, wherein the indication information is first indication information, and the processor is configured to perform:

sending second indication information to the user equipment, wherein the second indication information is configured to indicate the target moment.

20. The communication device of claim 18, wherein sending the indication information to the user equipment comprises:

sending broadcast information to the user equipment, wherein the broadcast information comprises the indication information; or, sending a dedicated signaling to the user equipment, wherein the dedicated signaling comprises the indication information.

* * * * *